Figure 1:
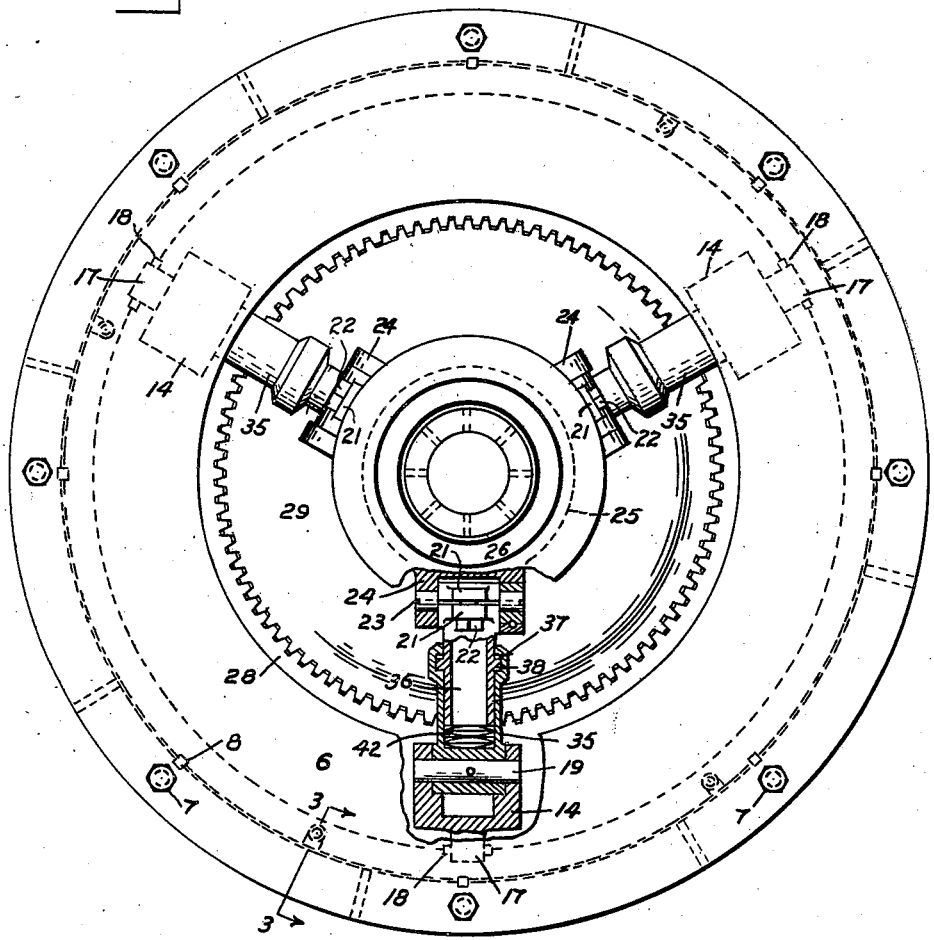

Sept. 14, 1943.  H. A. KNOX  2,329,205
CLUTCH
Filed April 29, 1942  4 Sheets-Sheet 1

Inventor
Harry A. Knox
By G. J. Kesserich & J. H. Church
Attorneys

Sept. 14, 1943.  H. A. KNOX  2,329,205
CLUTCH
Filed April 29, 1942  4 Sheets-Sheet 2
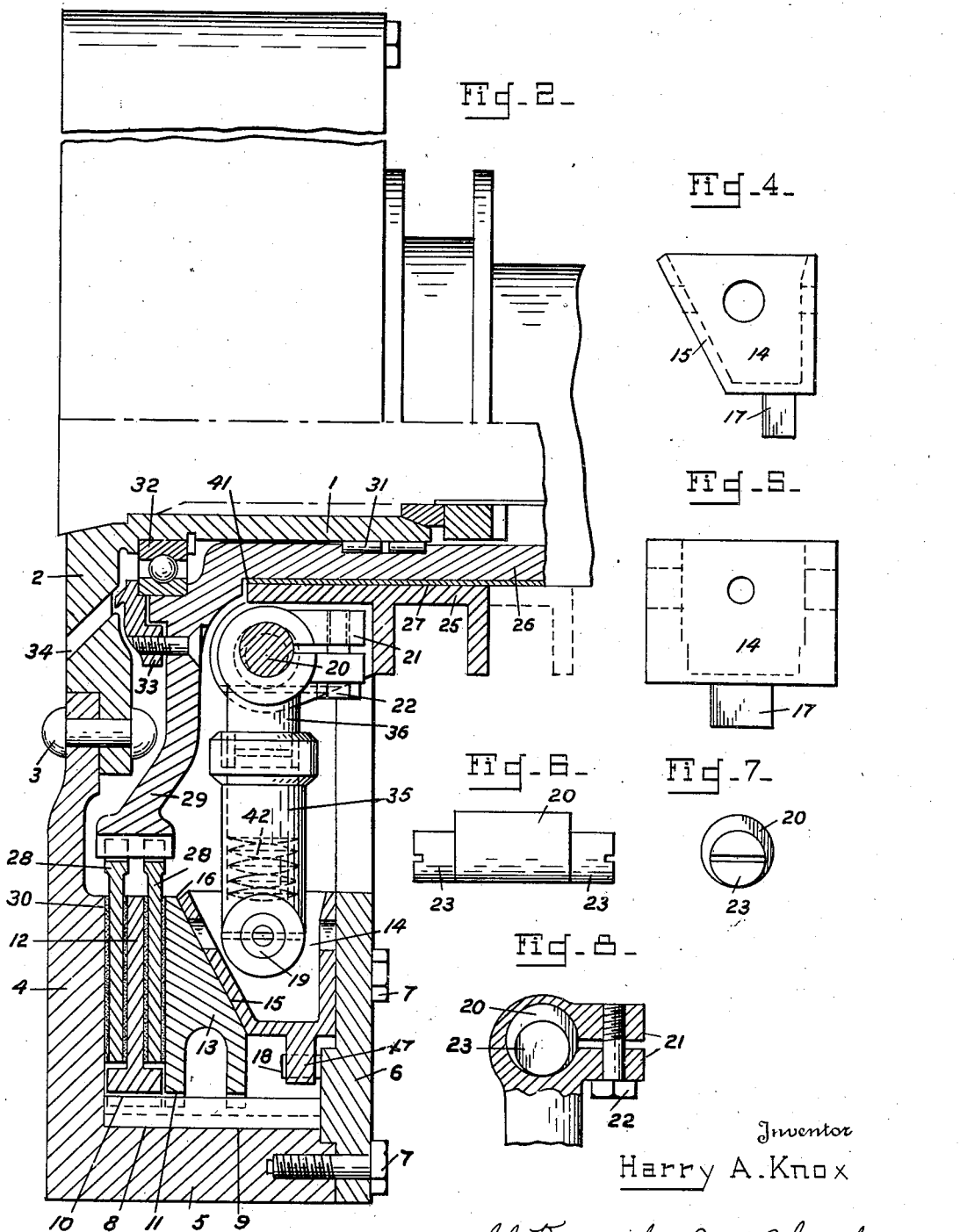
Inventor
Harry A. Knox Sept. 14, 1943.  H. A. KNOX  2,329,205
CLUTCH
Filed April 29, 1942    4 Sheets-Sheet 3
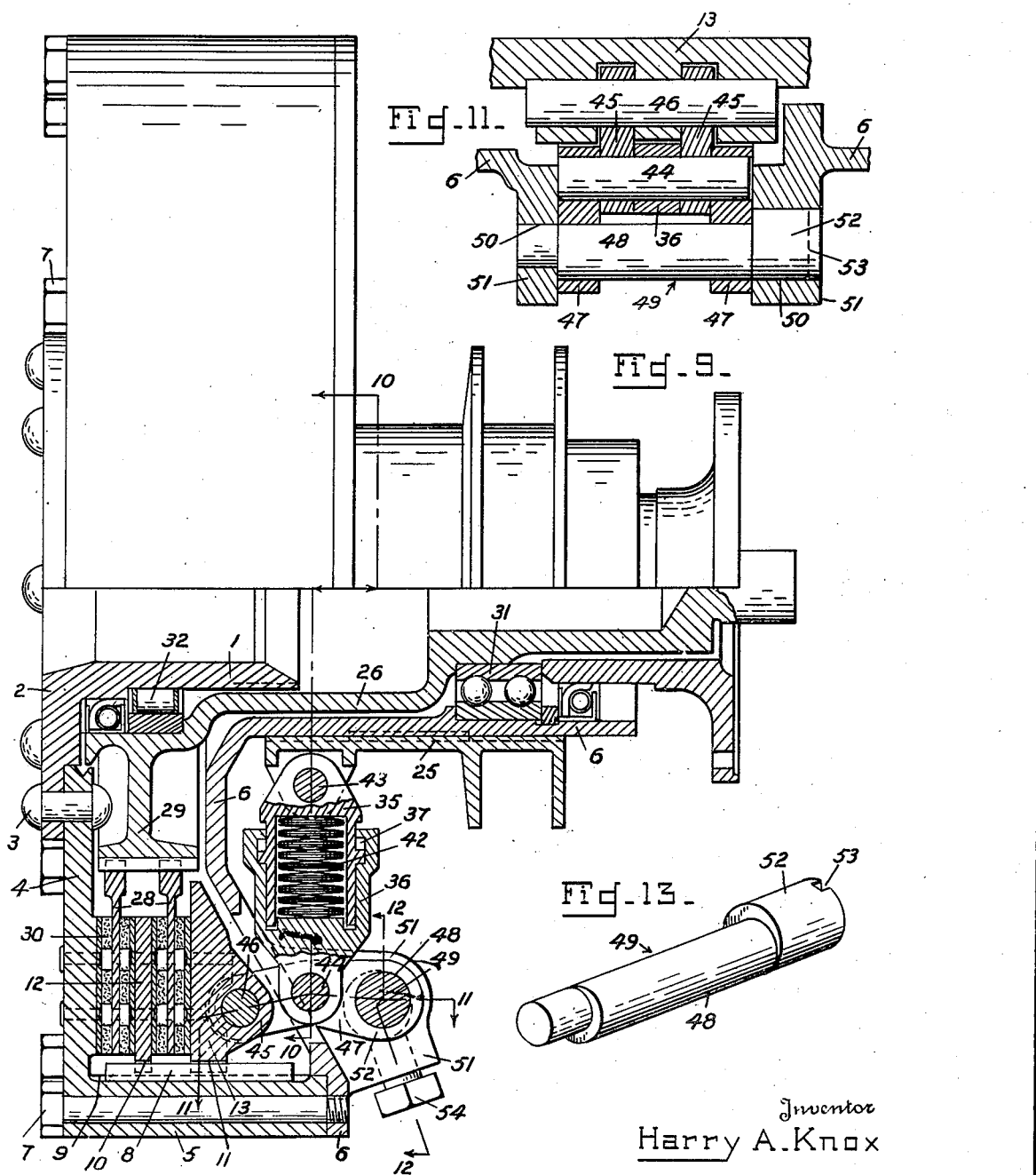
Inventor
Harry A. Knox Sept. 14, 1943.   H. A. KNOX   2,329,205
CLUTCH
Filed April 29, 1942   4 Sheets-Sheet 4

Inventor
Harry A. Knox
By G.J. Kessenich & J.H. Church
Attorneys

Patented Sept. 14, 1943

2,329,205

UNITED STATES PATENT OFFICE 2,329,205

CLUTCH

Harry A. Knox, Washington, D. C.

Application April 29, 1942, Serial No. 440,891

14 Claims. (Cl. 192—68)

(Granted under the act of March 3, 1883, as amended April 30, 1928; 370 O. G. 757)

The invention described herein may be manufactured and used by or for the Government for governmental purposes, without the payment to me of any royalty thereon.

This application is a continuation-in-part of my copending application, Serial No. 391,330 filed May 1, 1941, and now abandoned.

This invention relates to a clutch, particularly for use in automotive vehicles.

The clutch of the invention is of the friction type having plates which are placed in frictional engagement by means of a toggle-actuated wedge or a compound toggle. According to one embodiment the novel toggle unit is of a type which continuously and automatically compensates for clutch wear, has an eccentric crank action with the toggle arms very nearly at right angles in the neutral position, gives a high friction force for a small applied force, and eliminates heavy springs in the clutch engaging mechanism. A modification thereof features a compound toggle unit which also continuously and automatically compensates for normal clutch wear, provides a substantially constant clutch engaging force at all times, and includes a novel arrangement to permit periodic major wear adjustments of the clutch engaging elements.

It is therefore an object of the invention to produce a simplified clutch capable of a large friction-creating force by a short stroke, which automatically and continuously compensates for ordinary clutch wear, and which permits quick and convenient periodic major wear adjustments of the clutch engaging elements.

To these and other ends, the invention consists in the construction, arrangement and combination of elements described hereinafter and pointed out in the claims forming a part of this specification.

Figure 3:
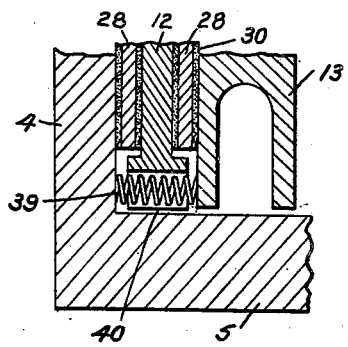
Figure 10:
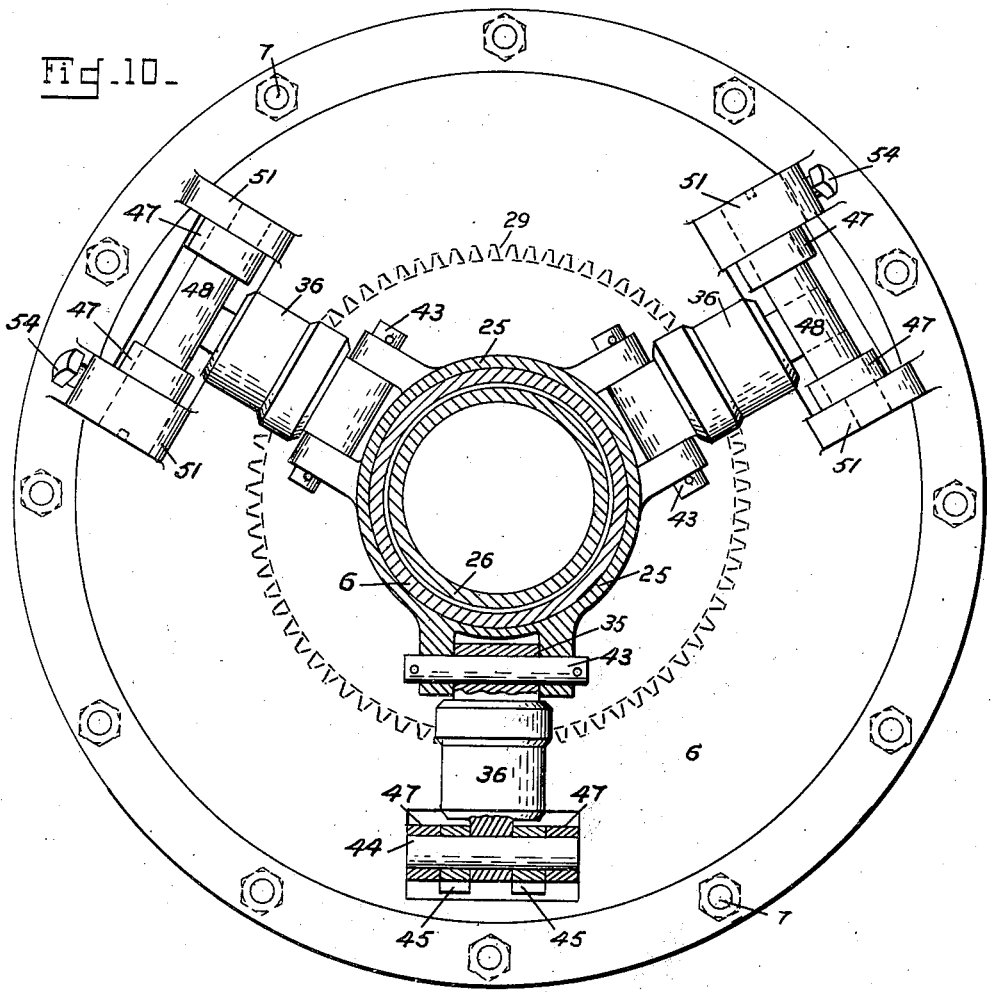
Figure 12:
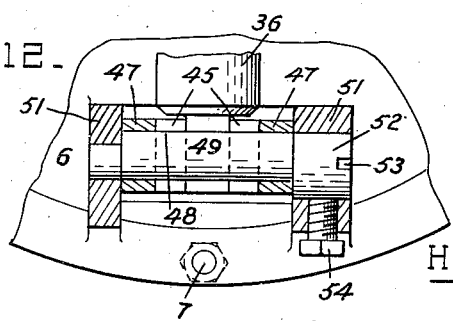

In the drawings:

Fig. 1 is a plan view of a practical embodiment of the clutch, showing sections behind broken portions, Figure 2 is a view in elevation of the clutch of Fig. 1, to larger scale, showing most of the lower half in axial section and the upper half broken and foreshortened, Figure 3 is a detail section taken on the line 3—3 of Figure 1, Figure 4 is a side elevation of a detail from Figure 2 showing the wedge cup, Figure 5 is a front elevation of the wedge cup of Figure 4, Figure 6 is a front elevation of a detail from Figure 2 showing the eccentric shaft, Figure 7 is an end view of the shaft shown in Figure 6, Figure 8 is a fragmentary detail, partly in section, showing the portion of the vertical toggle arm of Figure 2 mounted on the shaft of Figures 6 and 7, Figure 9 is a side elevational view of a modified clutch structure, showing most of the lower half in axial section, Fig. 10 is a sectional view on the line 10—10 of Fig. 9, the telescoping members being illustrated in elevation, Figure 11 is a sectional view through the toggle linkage on the line 11—11 of Fig. 9, Figure 12 is a sectional view through the major wear adjustment arrangement on the line 12—12 of Fig. 9, and Figure 13 is a perspective view of the major wear adjusting pin.

Referring to the drawings by characters of reference, there is shown a drum-shaped driving unit including a central shaft 1 with a face plate 2, to which is riveted as at 3, a plate extension 4, flanged as at 5. To the peripheral flange 5 is fixed a back plate 6, by means of screws 7. Keys 8, carried in transverse channels 9 on the inside of flange 5, engage in transverse channels 10 and 11 in the peripheries of annular plates 12 and 13 respectively and thus carry such plates in rotation with the driving unit.

Each of three hollow blocks 14 has a slant surface 15 adapted to nest with a corresponding slant surface 16 recessed in the plate 13. Lugs 18 on the back plate 6 engage depending lugs 17 on the blocks 14 which are thus carried in rotation with the driving unit, and with them are carried the toggle units.

Each toggle unit has a vertical arm journalled on a wrist pin 19 which is carried by the block 14. The upper portion of the vertical arm is clamped on a pin 20 by means of a split hub 21 and screw 22. Pin 20 has eccentric extremities 23 journalled in a radial bracket 24 extending from a collar 25 surrounding the driven shaft 26 and slidable on a bearing sleeve 27 on the said shaft 26.

Inserted on either side of ring-plate 12 are internal ring gears 28 dovetailed into the teeth of a spur gear 29 integral with the driven shaft 26 thus making ring gears 28 a part of the driven system. These ring gears 28 may be less or greater in number than two, depending upon service requirements. Between the plates and the driving system is the friction material 30. This material may be carried either by the driven plates 28 or by the driving members 4, 12 and 13, but preferably by the latter members for the reason that it is desirable to keep the weight of the driven members to a minimum.

Driven shaft 26 rotates around drive shaft 1 on roller bearings 31 and a ball-bearing race 32 held by a keeper 33. Centrifugally ejected lubricant will pass out at 34 rather than down into the clutch plates.

The radial arm of the toggle unit is composed of two telescoping sections, an outer sleeve 35 and an inner, hollow stem 36, the two being held together by a bayonet joint as shown at 37 permitting a small amount of play between the telescoping members. Inserted in the outer sleeve 35 and bearing against the outer part of inner stem 36 is a stack of Belleville spring washers 42 which put a pressure on blocks 14 and thus compensate for wear in the clutch up to the limit of the play in the bayonet joint 37. The thrust is derived from axial sliding of collar 25 which carries with it the eccentric ends 23 of the pin 20. These ends 23 rotate in their journals in the bracket 24, their centers remaining a constant distance from the clutch axis, but since the pin 20 is held against rotation by the clamping action of split hub 21, the inner stem 36 of the vertical toggle arm will be forced downward bringing the spring washers into play and resulting in engagement of the clutch.

When the play in the bayonet joint 37 has been exhausted by clutch wear, a major adjustment is made by resetting the pin 20 in the split hub 21.

Springs 39 in slots 40 in the periphery of plate 12 and acting between plate 4 and plate 13 prevent rubbing of the clutch parts when idling.

The clutch of the present invention incorporates novel features wherein a light thrust will transmit relatively large pressures to the friction members. This is due to the fact that the toggle members are set at an angle very nearly equal to 90°. This is made possible by the design of the vertical toggle with telescoping members and resilient seating therein. Otherwise, wear in the clutch plates would prohibit a right-angled toggle of small travel.

It will be further noted that the usual heavy springs engaging the sliding applicator 25 are dispensed with in the clutch of the present invention. With clutch engaged (the condition shown in Figure 2) the vertically set toggle arm is practically self-sustaining since the eccentrics 23 are almost, if not quite, on dead center, and the comparatively light force of the Belleville springs is sufficient to keep the clutch engaged. The eccentrics 23 may be thrown slightly beyond dead center, and for this purpose the path of travel of the collar 25 is extended slightly beyond that required for 90° position of the vertical toggle as shown at 41.

In Fig. 9 there is illustrated a modified toggle unit for actuating the clutch. More convenient access to the unit is permitted for making major wear adjustments. In addition, there is provided an extremely practical means for compensating for the reduction in the pressure which is exerted by the Belleville springs 42 when the telescoping sleeves 35—36 of the toggle unit are extended as a result of wear in the clutch plates. In this organization the inner sleeve 35 constitutes a spring washer cage and is pivoted to the collar 25 by an ordinary pin 43. The outer telescoping member 36 of the cage is coupled to a compound toggle linkage assembly by a pin 44; see also Fig. 11. This assembly includes a pair of arms 45 which is pivoted at one of its ends to the pin 44 and at its opposite end to a pin 46 which is journalled in the annular driving plate 13. A second pair of parallel arms 47 is pivotally mounted on pin 44 and on the eccentric intermediate portion 48 of a wear adjusting pin 49 which in turn rests in journals 50 in a pair of extending portions 51 of the fixed back plate 6. One end of the wear adjusting pin 49 is provided with an enlargement 52 and a kerf 53 for the reception of an adjusting tool. The adjusting pin is held in a fixed position by a locking screw 54 which is threaded into one of the extending portions 51 and bears against the enlargement 52. The presence of the enlargement insures a secure bite on the adjusting pin when screw 54 is tightened.

By placing the Belleville washers 42 entirely within the inner telescoping member 35 in the modification illustrated in Fig. 9, the application of stresses through the axes of the washers is allowed and in addition there is provided more space to receive a greater number of washers.

A lever (not shown) engages the collar 25 and by means of a spring (not shown) urges the collar in a direction to bring the telescoping sleeves 35—36 into a position perpendicular to the driven shaft 26. In this position the full load or thrust imparted to the clutch plates is that inherent in the spring-washer assembly.

To set the clutch, the collar 25 is held at the position desired to limit free movement and the clutch plates are brought into contact by adjustment of the wear adjusting pin 49. Since this setting represents no load on the clutch plates, the telescoping members 35 and 36 will be extended to the limit of the bayonet joint 37. When collar 25 is released, it will be carried by its lever and spring (not shown) so that the telescoping members 35 and 36 will be brought into perpendicularity with the driven shaft 26. The thrust on the clutch plates at this time is determined by the forces exerted by the spring-washers which at this stage form a link in the compression system. The play in the bayonet joint 37 limits the total possible length of the radial arm formed by the telescoping sleeves 35 and 36 in this system. This play or lost motion is of such an amount as to prevent the knee in the toggle arms 45, 47 from being flattened so as to attain perpendicularity with the radial arm.

As the faces 30 of the clutch plates wear, compensation is automatically provided by the extension of the radial arm 35, 36 through the agency of the spring washers 42 which continue to function as a link in the compression system. The expansion of the spring washers tends to flatten the knee of the compound toggle linkage assembly and thrusts the annular driving plate 13 into closer engagement with the friction disk assembly thereby taking up for wear. When the limit of the bayonet joint 37 has been reached, a major adjustment is necessary. This is conveniently and quickly made by backing off the locking screw 54 and turning the wear adjusting shaft 49 so that the eccentric portion 48 creates a more acute knee in the compound toggle and places the Belleville washers in compression. Locking screw 54 is then tightened and the major adjustment is completed. This operation is repeated when another adjustment is required.

The modification of Figure 9 offers several noteworthy advantages: (1) The major adjustment is located at an easily accessible position and (2) the lessening of the expansive force in the spring washers due to extension is compensated for by the increased mechanical advantage of the compound toggle due to this same extension.

I claim:

1. A friction clutch, comprising a driven unit and a driving unit, a pressure transmitting mechanism for applying pressure to said units to create friction therebetween, said mechanism comprising a wedge in cooperating relation with said units, a connecting rod carried by said wedge, a thust unit with a line of action substantially at right angles to the connecting rod, and a linkage between said thrust unit and said connecting rod comprising an eccentric pin with its offset portions rotatively seated in the thrust unit and connecting rod respectively, means to hold one offset portion against rotation in its seat, the other offset portion being free to rotate in its seat.

2. A clutch as in claim 1 wherein said holding means is releasable for adjustment of the position of the held offset portion.

3. A clutch as in claim 1 in which said connecting rod comprises telescoping members loosely keyed together and spring means to hold said members distended.

4. A clutch as in claim 1 in which said connecting rod comprises telescoping members loosely interconnected by means of a bayonet joint and at least one spring washer engaging said telescoping members and holding them extended within the limits of the bayonet joint.

5. A clutch comprising a drum-shaped driving unit, a driven unit comprising a shaft coaxial with said driving unit, juxtaposed friction surfaces on said units, respectively, means for engaging said surfaces comprising a wedge mounted in the drum-shaped unit for radial sliding motion therein, a collar mounted concentrically with the said units for sliding motion axially thereof, a connecting rod pivoted to said wedge, pivot means between said rod and said collar comprising an eccentric, and releasable means to hold said pivot means against rotation.

6. A clutch as in claim 5 wherein said connecting rod comprises telescoping members loosely keyed together and spring means to hold said members distended.

7. A clutch comprising a drum-shaped driving unit, a driven unit comprising a shaft coaxial with said driving unit, juxtaposed friction surfaces on said units, respectively, means for engaging said surfaces comprising a wedge mounted in the drum-shaped unit for radial sliding motion therein, a collar mounted concentrically with the said units for sliding motion axially thereof, a connecting rod extending generally radially of the drum and comprising an outer portion pivoted to said wedge, and an inner portion loosely keyed to said outer portion to permit relative radial motion between said portions, a split hub and contractile means therefor on said inner portion, and a pin clamped in said split hub, said pin comprising an eccentric extension journalled in said collar.

8. In a clutch including driving and driven members, friction elements on the members, a pressure transmitting mechanism for exerting a thrust on the elements to bring them into operative engagement, said mechanism comprising an actuator, a telescoping spring cage pivotally mounted at one of its ends to the actuator and substantially radially disposed thereto, spring means in the cage tending to distend the parts thereof, means constraining the length of the cage; a compound toggle having its intermediate portion coupled to the other end of the spring cage, an adjustable eccentric pin journalled in the driving member and pivotally engaging an end of the toggle, locking means for the eccentric pin, and a thrust plate pivoted to and movable by the other end of the toggle for imparting pressure to the friction elements.

9. The structure as in claim 8 in which the telescoping sections of the spring cage are interconnected by means of a bayonet joint, the limits of said joint establishing the effective length of the cage.

10. In a clutch including driving and driven members, friction elements on the members, a pressure transmitting mechanism for exerting a thrust on the elements to bring them into operative engagement, said mechanism comprising an actuator concentric with the axis of rotation of the members, a telescoping extensible spring housing pivotally mounted at one of its ends to the actuator and extending substantially radially outwardly therefrom, spring means in the cage tending to distend the parts thereof, means on the housing establishing the length thereof, a compound toggle having its intermediate portion coupled to the outer end of the extensible spring housing, an adjustable eccentric pin journalled in the driving member and pivotally engaging an end of the toggle, locking means in the driving member for securing the eccentric pin in a predetermined position of adjustment, and a thrust plate pivoted to and movable by the other end of the toggle for imparting pressure to the friction elements.

11. In a clutch, a drum-shaped driving unit, a driven unit including a shaft coaxial with the driving unit, friction elements on the units, a pressure transmitting mechanism for exerting a thrust on the elements to bring them into operative engagement, said mechanism comprising a reciprocable actuating collar mounted concentrically with the units, a telescoping extensible spring housing pivotally mounted at one of its ends to the collar and extending substantially radially outwardly therefrom, means on the housing establishing the length thereof, spring means in the cage tending to distend the parts thereof, a compound toggle having its intermediate portion coupled to the outer end of the spring housing, an adjustable eccentric pin journalled in the driving member and pivotally engaging an end of the toggle, locking means in the driving member for securing the eccentric pin in a predetermined position of adjustment, and a thrust plate pivoted to and movable by the other end of the toggle for imparting pressure to the friction elements.

12. In a clutch mechanism, a thrust unit comprising telescoped sections keyed together through a loose bayonet joint permitting limited longitudinal displacement relative to each other, said sections being joined respectively to parts of the mechanism to form a link therein, and spring means within said unit tending to hold said sections distended whereby the thrust is communicated through the spring means and wear in the clutch parts is automatically and continuously compensated by distension of said sections.

13. In a clutch as in claim 7, spring means between the said portions of said connecting rod to hold them distended.

14. In a clutch mechanism, a toggle arm thrust unit comprising longitudinally aligned sections joined respectively to parts of the mechanism to form a link therein and loosely coupled to permit limited relative longitudinal motion of said sections, and spring means between said sections to normally hold them distended at the limit of their relative motion whereby the thrust is communicated through the spring and wear in the clutch parts is automatically and continuously compensated by distension of said sections, the connection between one of said sections and the parts to which it is joined comprising pivot means including an eccentric, and releasable means to hold said pivot means against rotation.

HARRY A. KNOX.